United States Patent [19]

Penn

[11] Patent Number: 5,283,893
[45] Date of Patent: Feb. 1, 1994

[54] METHOD FOR SORTING OBJECTS IN A SEQUENTIALLY ADDRESSED ARRAY

[75] Inventor: Robert C. Penn, Santa Clara, Calif.

[73] Assignee: Rolm Company, Santa Clara, Calif.

[21] Appl. No.: 513,726

[22] Filed: Apr. 24, 1990

[51] Int. Cl.$^5$ .............................................. G06F 7/00
[52] U.S. Cl. ................................... 395/600; 395/650; 340/146.2; 364/962.3; 364/246.2; 364/DIG. 2
[58] Field of Search ................................ 395/600, 650; 340/146.2

[56] References Cited

U.S. PATENT DOCUMENTS

| | | | |
|---|---|---|---|
| 5,111,465 | 5/1992 | Edem et al. | 371/54 |
| 5,179,699 | 1/1993 | Lyer et al. | 395/650 |
| 5,210,870 | 5/1993 | Baum et al. | 395/600 |

OTHER PUBLICATIONS

K. E. Batcher "Sorting Networks and Their Applications" AFIPS Conf. Proc. vol. 32 1968, pp. 307-314. 1968.

J. L. Bentley Programming Pearls Addison-Wesley 1986 pp. 72-73.

C. K. Wong Algorithmic Studies in Mass Storage Systems Computer Science Press 1983 pp. 262-269.

Primary Examiner—Thomas C. Lee
Assistant Examiner—Peter Y. Wang
Attorney, Agent, or Firm—Michael B. Einschlag

[57] ABSTRACT

Method for sorting, in place, objects in an array of sequentially addressed locations into two partitions, the first partition containing all of the even addressed objects and the second partition containing all of the odd addressed objects. In accordance with the method, an array containing a number of elements equaling an even power of two is split into two partitions, the first partition containing the contents of the first half of the locations and the second partition containing the contents of the second half of the locations. Then, the odd addressed locations in the first partition are exchanged with the even addressed locations in the second partition. Then, if a partition only contains two elements, the partition has been sorted, however, if there are more than two elements in the partition, control is transferred to the beginning recursively so that, now, the partition is treated as the array.

2 Claims, 2 Drawing Sheets

METHOD FOR SORTING OBJECTS IN A SEQUENTIALLY ADDRESSED ARRAY

TECHNICAL FIELD OF THE INVENTION

The present invention pertains to method for sorting, in place, objects in an array of sequentially addressed locations into two partitions, the first partition containing all of the even addressed objects and the second partition containing all of the odd addressed objects.

BACKGROUND OF THE INVENTION

In translating relocatable object code into an absolute addressed ROM image, there is a need, in certain applications, to split the object code image into even addressed and odd addressed locations. One application where this need arises is when an object code image which is produced in a 16 bit machine must be split into two partitions for the purpose of programming pairs of 8 bit PROM devices, one device at a time.

In solving the above-described need, in large arrays, there are instances where large additional amounts of storage are not available for the purpose of splitting the array. Therefore, there is a need in the art for a method for sorting, in place, objects in an array of sequentially addressed locations into two partitions, the first partition containing all of the even addressed objects and the second partition containing all of the odd addressed objects.

SUMMARY OF THE INVENTION

Embodiments of the present invention advantageously satisfy the above-identified need in the art and provide method for sorting, in place, objects in an array of sequentially addressed locations into two partitions, the first partition containing all of the even addressed objects and the second partition containing all of the odd addressed objects.

In accordance with the inventive method, an array containing a number of elements equaling an even power of two is split into two partitions, the first partition containing the contents of the first half of the locations and the second partition containing the contents of the second half of the locations. Then, the odd addressed locations in the first partition are exchanged with the even addressed locations in the second partition. Then, if a partition only contains two elements, the partition has been sorted, however, if there are more than two elements in the partition, control is transferred to the beginning recursively so that, now, the partition is treated as the array.

The inventive sorting method is also applicable to arrays wherein the number of elements is not equal to an even power of two. In one embodiment, this is accomplished by padding the array to an even power of two with a relatively unique object and then performing the inventive sort. Finally, the padded elements may be removed after the sort.

The resultant array contains two partitions, the first partition containing all even addressed locations and the second contains all of odd addressed locations, however, it should be clear to those of ordinary skill in the art that the order of these two arrays may be reversed.

As one can readily appreciate from the above, the inventive method is recursive where the maximum level of recursion is $(LOG_2 N) - 2$; where N is the size of the array. In addition, the number of array element exchange operations which must be performed is $((LOG_2 N) - 1)N/4$ and the number of times the procedure is called for a given array is $(N/2) - 1$. Finally, the amount of stack space which is required is closely estimated by:

$$S = IP_s + RA_s + LV_s((LOG_2 N) - 1)$$

where:
$IP_s$ = Total size in bytes of the Input Parameters
$RA_s$ = Total size in bytes of the Procedure Return Address
$LV_s$ = Total size in bytes of the Procedure Local (Stack) Variable

BRIEF DESCRIPTION OF THE DRAWING

A complete understanding of the present invention may be gained by considering the following detailed description in conjunction with the accompanying drawing, in which.

DETAILED DESCRIPTION

Figure 1:
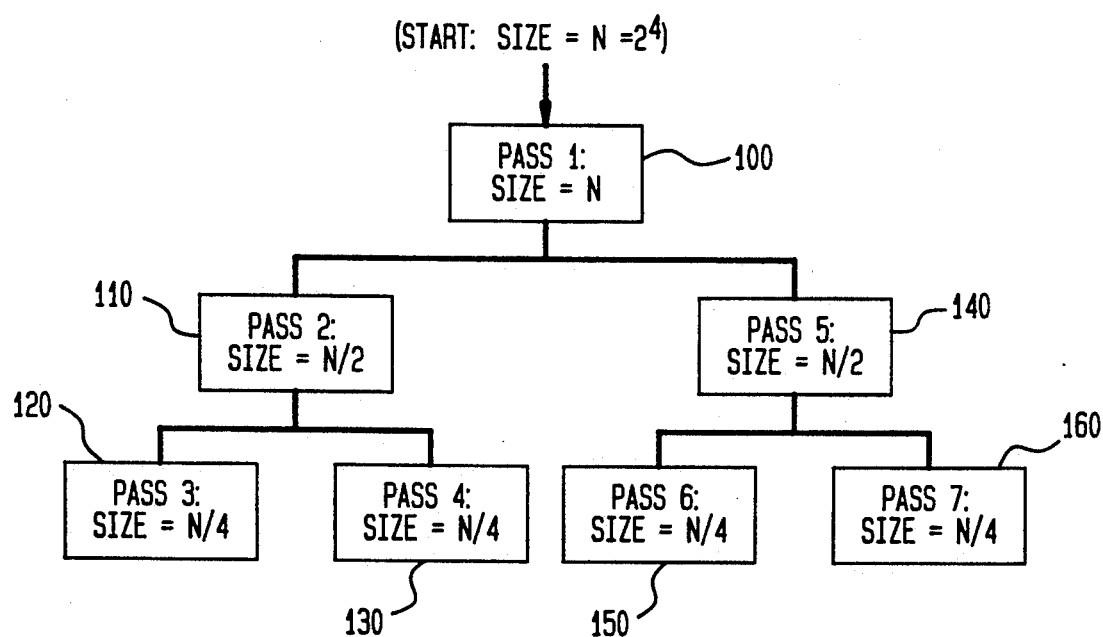
FIG. 1 is a chart which illustrates the steps of the inventive method.

FIG. 1 is a chart which illustrates the steps of the inventive sorting method. Table 1 shows the contents of the array after each pass of the sorting method as shown in FIG. 1. In particular, as shown in FIG. 1 and as illustrated in Table 1, we are sorting an array having a number of objects which equals an even power of 2, i.e., an array of 16, $2^4$, sequentially addressed objects, the addresses starting at 0 and ending at 15.

Pass 1 shown as box 100 in FIG. 1, entails taking the original array and considering it to be comprised of two partitions, the first partition having addresses which are less than N/2, N being the total number of elements in the array, and the second partition having addresses which are greater than or equal to N/2. Then, going through the odd addressed objects in the first partition, exchanging them, one at a time, with the evenly addressed objects in the second partition, i.e., objects having an address which is $N/2 - 1$ greater than the address of the odd addressed object in the first partition. Table 1, Pass 1 shows the results of Pass 1 where the new location position refers to the object at the originally addressed location.

Pass 2 shown as box 110 in FIG. 1, entails taking the first partition from Pass 1, and considering that first partition from Pass 1, in turn, to be comprised of two partitions, the first partition having addresses which are less than n/2, n being equal to N/2, and the second partition having addresses which are greater than or equal to n/2. Then, going through the odd addressed objects in the first partition, exchanging them, one at a time, with the evenly addressed objects in the second partition, i.e., objects having an address which is $n/2 - 1$ greater than the address of the odd addressed object in the first partition. Table 1, Pass 2 shows the results of Pass 2.

Pass 3 shown as box 120 in FIG. 1, entails taking the first partition from Pass 2, and considering that first partition from Pass 2, in turn, to be comprised of two partitions, the first partition having addresses which are less than n/2, n being equal to N/4, and the second partition having addresses which are greater than or equal to n/2. Then, going through the odd addressed objects in the first partition, exchanging them, one at a time, with the evenly addressed objects in the second partition, i.e., objects having an address which is n/2−1 greater than the address of the odd addressed object in the first partition. Table 1, Pass 3 shows the results of Pass 3.

Pass 4 shown as box 130 in FIG. 1, entails taking the second partition from Pass 2, and considering that second partition from Pass 2, in turn, to be comprised of two partitions, the first partition having addresses which are less than n/2, n being equal to N/4, and the second partition having addresses which are greater than or equal to n/2. Then, going through the odd addressed objects in the first partition, exchanging them, one at a time, with the evenly addressed objects in the second partition, i.e., objects having an address which is n/2−1 greater than the address of the odd addressed object in the first partition. Table 1, Pass 4 shows the results of Pass 4.

Pass 5 of box 140, Pass 6 of box 150, and Pass 7 of box 160 are described in similar fashion, with reference to Table 1, as has been set forth above for Passes 1-4. Finally, Table 1 shows the final locations of the objects of the original array after the inventive sorting method has been performed.

As one of ordinary skill in the art will readily appreciate, the inventive sorting method is a recursive method and, as such and as can be further appreciated from FIG. 1, the various recursion levels are set forth in Table 1.

Figure 2:
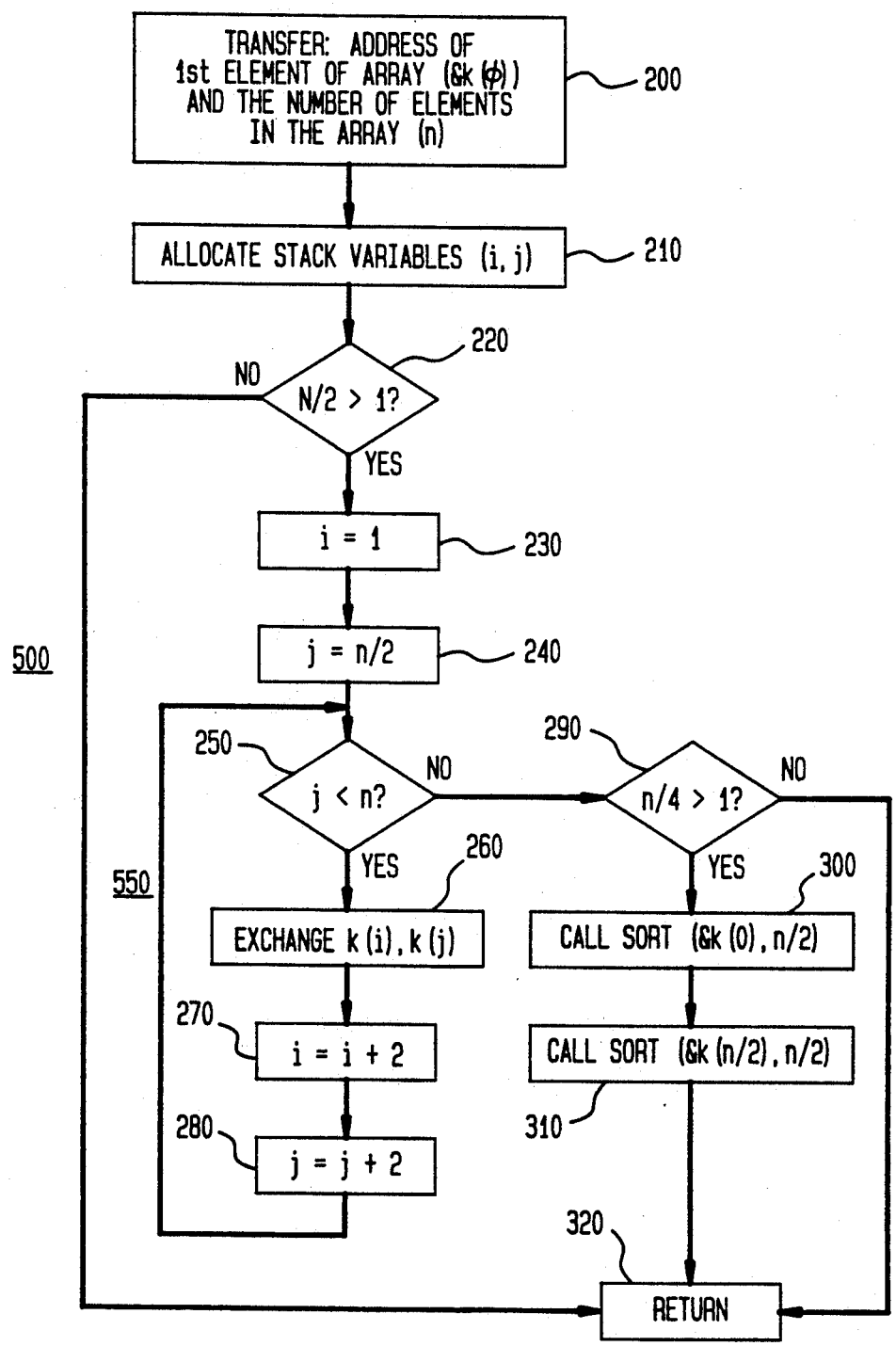
FIG. 2 is a flowchart of the steps of the inventive method.

The preferred embodiment of the inventive method is carried out on a processor and FIG. 2 is a flowchart of the steps of the inventive method for use in coding a computer program for execution on the processor.

FIG. 2 illustrates a recursive routine which is referred to below and in FIG. 2 as SORT and, in accordance with well known programming terminology, the routine is invoked by use of the expression CALL SORT( parameter 1, parameter 2). As shown in box 200, when the recursive routine SORT is invoked, two parameters are passed to it, parameter 1 being the address of the first element of the array and parameter 2 being the number of elements in the array, the number of elements being assumed to be an even power of 2. Then control is transferred to box 210.

At box 210, stack variables i and j are allocated in a manner which is well known to those of ordinary skill in the art to permit the recursive behavior of the inventive method. Then control is transferred to box 220 at the beginning of loop 500.

At box 220, a determination is made as to whether n/2 is greater than 1, where n is the value of parameter 2 which represents the number of elements in the array. If n/2 is not greater than 1 then control is transferred to box 320, otherwise control is transferred to box 230.

At box 230 stack variable i is initialized to 1 and control is transferred to box 240 where stack variable j is set equal to n/2. Then control is transferred to box 250 at the beginning of loop 550.

At box 250, a determination is made as to whether j is less than n and, if it is, control is transferred to box 260, otherwise, control is transferred to box 290.

At box 260, the object of the array having the address i is exchanged with the object of the array having the address j. Then control is transferred to box 270. At box 270, stack variable 1 is incremented by 2 and control is transferred to box 280. At box 280, stack variable j is incremented by 2 and control is transferred to box 250 at the head of loop 550.

At box 290, a determination is made as to whether n/4 is greater than 1 and, if it is, control is passed to box 300, otherwise control is transferred to box 320.

At box 300, routine SORT is invoked at a recursion level for a first partition of the initial array comprising half the elements starting at the first element and control is transferred to box 310. At box 310, routine SORT is invoked at a recursion level for a second partition of the initial array comprising half the elements starting at an address which is n/2 larger than the first element and control is then transferred to box 320.

Lastly, at box 320, the stack space for the parameters is deallocated in accordance with methods which are well known to those of ordinary skill in the art and control is transferred in accordance with methods which are well known to those of ordinary skill in the art to a predetermined address which has been determined by the system which implements the call function.

As one can readily appreciate from the above, the inventive method is recursive where the maximum level of recursion is $(LOG_2 N)-2$; where N is the size of the array. In addition, the number of array element exchange operations which must be performed is $((LOG_2 N)-1)N/4$ and the number of times SORT is called for a given array is $(N/2)-1$. Finally, the amount of stack space which is required is closely estimated by:

$$S = IP_s + RA_s + LV_s((LOG_2 N)-1)$$

where:
$IP_s$ = Total size in bytes of the Input Parameters
$RA_s$ = Total size in bytes of the Procedure Return Address
$LV_s$ = Total size in bytes of the Procedure Local (Stack) Variables The inventive sorting method is also applicable to arrays wherein the number of elements is not equal to an even power of two. In one embodiment, this is accomplished by padding the array to an even power of two and then performing the inventive sort. In a further embodiment, the padding is done with a relatively unique object. Finally, the padded elements may be removed after the sort.

The resultant array contains two partitions, the first partition containing all even addressed locations and the second contains all odd addressed locations, however, it should be clear to those of ordinary skill in the art that the order of these two arrays may be reversed.

It should be clear to those of ordinary skill in the art that further embodiments of the present invention may be made without departing from its teachings. For example, it is not necessary for the objects to be located physically at sequentially addressed locations as long as a map exists for addressing them at the sequentially addressed locations.

TABLE 1

| Contents of the array after each step of the inventive sorting method for an array comprised of the following sequential addresses: | | | | | | | | | | | | | | | | |
|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | Recursion |

TABLE 1-continued

| Pass | | | | | | New Location Positions | | | | | | | | | | Level |
|---|---|---|---|---|---|---|---|---|---|---|---|---|---|---|---|---|
| 1 | 0 | 8 | 2 | 10 | 4 | 12 | 6 | 14 | 1 | 9 | 3 | 11 | 5 | 13 | 7 | 15 | 0 |
| 2 | 0 | 4 | 2 | 6 | 8 | 12 | 10 | 14 | 1 | 9 | 3 | 11 | 5 | 13 | 7 | 15 | 1 |
| 3 | 0 | 2 | 4 | 6 | 8 | 12 | 10 | 14 | 1 | 9 | 3 | 11 | 5 | 13 | 7 | 15 | 2 |
| 4 | 0 | 2 | 4 | 6 | 8 | 10 | 12 | 14 | 1 | 9 | 3 | 11 | 5 | 13 | 7 | 15 | 2 |
| 5 | 0 | 2 | 4 | 6 | 8 | 10 | 12 | 14 | 1 | 5 | 3 | 7 | 9 | 13 | 11 | 15 | 1 |
| 6 | 0 | 2 | 4 | 6 | 8 | 10 | 12 | 14 | 1 | 3 | 5 | 7 | 9 | 13 | 11 | 15 | 2 |
| 7 | 0 | 2 | 4 | 6 | 8 | 10 | 12 | 14 | 1 | 3 | 5 | 7 | 9 | 11 | 13 | 15 | 2 |

| Final location positions: | | | | | | | | | | | | | |
|---|---|---|---|---|---|---|---|---|---|---|---|---|---|
| Even Locations | | | | | | | | Odd Locations | | | | | |
| 0 | 2 | 4 | 6 | 8 | 10 | 12 | 14 | 1 | 3 | 7 | 9 | 11 | 13 | 15 |

What is claimed is:

1. Method for sorting objects stored in an original array of sequentially addressed locations of a memory apparatus associated with a processor, the sorting requiring movement of the objects within the original array, the number of elements in the original array being equal to an even power of two, the method being for sorting objects of the original array into a partition comprised of even addressed objects in the original array and a partition comprised of odd addressed objects in the original array, the method comprising the steps of:

the processor designating the original array as an array;

(a) the processor splitting the array into tow partitions, a first partition being comprised of a first half of the sequentially addressed locations in the array and a second partition being comprised of a second half of the sequentially addressed locations in the array;

(b) the processor for each location in the first partition, one location at a time, exchanging an object stored at each odd addressed location in the first partition with an object stored at a corresponding, even addressed location in the second partition, wherein a corresponding, even addressed location refers to a location having an address which is the address of the odd addressed location plus n/2−1 where n is the number of locations in the array; and (c) considering the first partition and the second partition separately, the first and second partitions each now being referred to as a new partition, the processor determining the number of locations in the new partition; wherein, if the new partition only contains two locations, the new partition has been sorted; however, if there are move than two locations in the new partition, returning to step (a) recursively so that the new partition is now treated as the array.

2. Method for sorting objects stored in an original array of sequentially addressed locations of a memory apparatus associated with a processor, the sorting requiring movement of the objects within the original array, the number of elements int eh original array being equal to an odd number, the method being for sorting objects of the original array into a partition comprised of even addressed objects int eh original array and a partition comprised of odd addressed objects in the original array, the method comprising the steps of:

the processor padding the original array to a number of locations equaling an even power of two and designating the padded array as an array;

(a) the processor splitting the array into two partitions, a first partition being comprised of a first half of the sequentially addressed locations in the array and a second partition being comprised of a second half of the sequentially addressed locations in the array;

(b) the processor, for each location in the first partition, one location at a time, exchanging an object stored at each odd addressed location in the first partition with an object stored at a corresponding, even addressed location in the second partition, wherein a corresponding, even addressed location refers to a location having an address which is address of the odd addressed location plus n/2−1 where n is the number of locations in the array; and (c) considering the first partition and the second partition separately, the first an second partitions each now being referred to as a new partition, the processor determining the number of locations in the new partition; wherein, if the new partition only contains two locations, the new partition has been sorted; however, if there ar more than two locations in the new partition, returning to step (a) recursively so that the new partition is now treated as the array.

* * * * *